United States Patent
Ehinger et al.

(10) Patent No.: US 10,377,473 B2
(45) Date of Patent: Aug. 13, 2019

(54) DISCONNECTING A ROTOR

(71) Applicant: Bell Helicopter Textron Inc., Fort Worth, TX (US)

(72) Inventors: Ryan T. Ehinger, Irving, TX (US); David Sembritzky, Grapevine, TX (US); Carlos A. Fenny, Arlington, TX (US); Gary A. Cope, Keller, TX (US); Charles J. Kilmain, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1409 days.

(21) Appl. No.: 13/733,952

(22) Filed: Jan. 4, 2013

(65) Prior Publication Data
US 2014/0191079 A1    Jul. 10, 2014

(51) Int. Cl.
| | |
|---|---|
| *B64C 27/00* | (2006.01) |
| *B64C 27/12* | (2006.01) |
| *B64C 27/14* | (2006.01) |
| *B64C 27/82* | (2006.01) |
| *B64D 35/04* | (2006.01) |

(52) U.S. Cl.
CPC ............ *B64C 27/006* (2013.01); *B64C 27/12* (2013.01); *B64C 27/14* (2013.01); *B64C 27/82* (2013.01); *B64D 35/04* (2013.01)

(58) Field of Classification Search
CPC ....... B64C 27/82; B64C 27/006; B64C 27/12; B64C 27/04; B64C 2700/6281; B64C 2201/108; B64C 27/32; B64C 27/14; G05D 1/0858; G05D 1/0669; G05D 1/0061; G05D 1/102; G05D 1/0206; G05D 1/0808; G05D 1/085; G08G 5/0021; G01C 23/00; G01C 23/005; B64D 35/04
USPC ...................................... 244/17.13
See application file for complete search history.

(56) References Cited

U.S. PATENT DOCUMENTS

| | | | |
|---|---|---|---|
| 1,673,232 | A |  6/1928 | De La Cierva |
| 2,428,982 | A | 10/1947 | Miller et al. |
| 2,471,904 | A |  5/1949 | Seibel |
| 3,380,564 | A |  4/1968 | Beuer |
| 3,679,033 | A |  7/1972 | Wagner |
| 3,977,812 | A |  8/1976 | Hudgins |
| 5,046,923 | A * |  9/1991 | Parsons et al. ................. 416/30 |

(Continued)

FOREIGN PATENT DOCUMENTS

JP        6305493        11/1994

OTHER PUBLICATIONS

European Search Report in related European Application No. 13157514.4, dated Jul. 12, 2013, 6 pages.

(Continued)

*Primary Examiner* — Medhat Badawi

(57) ABSTRACT

According to one embodiment, a clutch may be coupled between a rotor system and a power train of a rotorcraft. The clutch may be operable to disengage the rotor system from the power train during operation of the power train. A clutch control system in communication with the clutch and include a rotorcraft condition sensor operable to sense an operating condition of the rotorcraft and a control unit operable to prevent the clutch from disengaging the rotor system from the power train if the operating condition of the rotorcraft fails to satisfy a predetermined criterion.

12 Claims, 4 Drawing Sheets

(56) References Cited

U.S. PATENT DOCUMENTS

| | | | |
|---|---|---|---|
| 5,195,700 A * | 3/1993 | Fogler et al. | 244/17.21 |
| 5,360,376 A | 11/1994 | Baldino | |
| 5,462,137 A | 10/1995 | Aubry et al. | |
| 6,050,521 A | 4/2000 | Regonini | |
| 6,077,042 A | 6/2000 | Pancotti et al. | |
| 6,929,215 B2 | 8/2005 | Arlton | |
| 7,168,533 B2 | 1/2007 | Podratzky | |
| 7,296,767 B2 * | 11/2007 | Palcic et al. | 244/17.11 |
| 2005/0151001 A1 | 7/2005 | Looper | |
| 2006/0269414 A1 * | 11/2006 | Palcic et al. | 416/170 R |
| 2009/0227419 A1 * | 9/2009 | Martin et al. | 477/84 |
| 2011/0001014 A1 * | 1/2011 | Gramling | B64C 27/18 244/198 |
| 2011/0121128 A1 * | 5/2011 | Balkus, Jr. | 244/17.21 |
| 2011/0178711 A1 * | 7/2011 | Christoph | 701/301 |
| 2012/0068007 A1 * | 3/2012 | Vialle | 244/17.19 |
| 2012/0153074 A1 * | 6/2012 | Nannoni et al. | 244/17.13 |
| 2013/0006448 A1 * | 1/2013 | Callou et al. | 701/5 |
| 2013/0120164 A1 * | 5/2013 | Greene et al. | 340/946 |
| 2013/0134264 A1 * | 5/2013 | Carter et al. | 244/7 A |
| 2013/0221153 A1 * | 8/2013 | Worsham et al. | 244/17.13 |
| 2013/0248648 A1 * | 9/2013 | Lesperance et al. | 244/17.13 |
| 2014/0062755 A1 * | 3/2014 | Kabrt et al. | 342/27 |
| 2014/0188332 A1 * | 7/2014 | Wittmaak et al. | 701/33.1 |
| 2014/0216290 A1 * | 8/2014 | Yee et al. | 102/374 |
| 2014/0249694 A1 * | 9/2014 | Cathcart et al. | 701/2 |
| 2014/0260127 A1 * | 9/2014 | Boyce | 55/306 |

OTHER PUBLICATIONS

European Examination Report in related European Application No. 13157514.4, dated Aug. 29, 2014, 4 pages.

Communication Under Rule 71(3) EPC in related European Application No. 13157514.4, dated May 22, 2015, 27 pages.

* cited by examiner

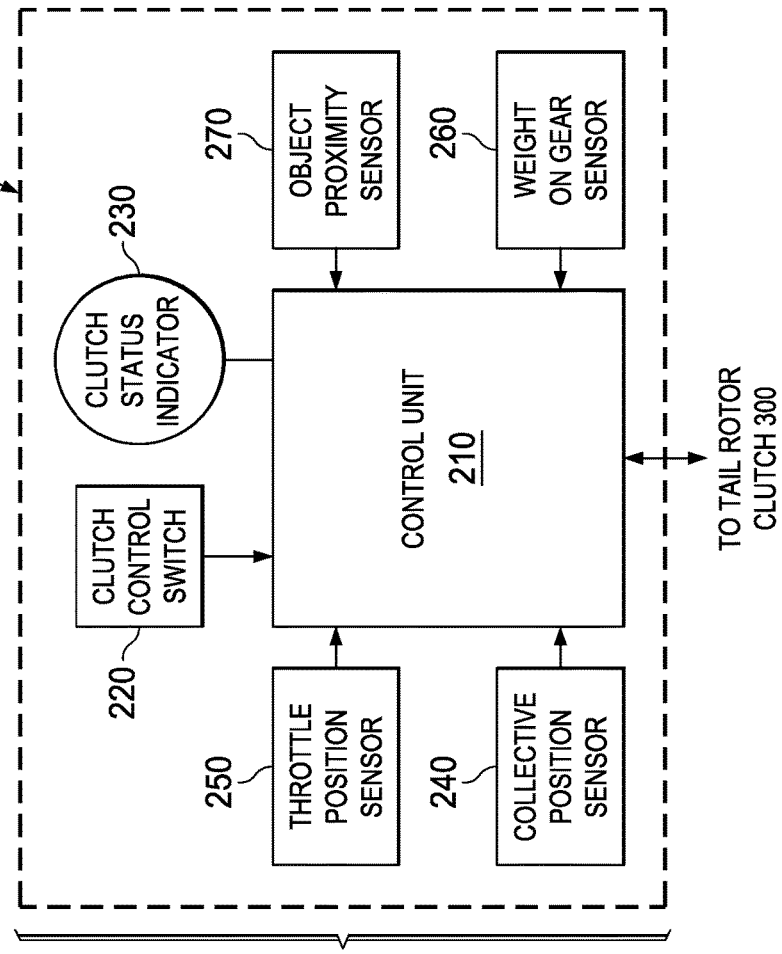
FIG. 2
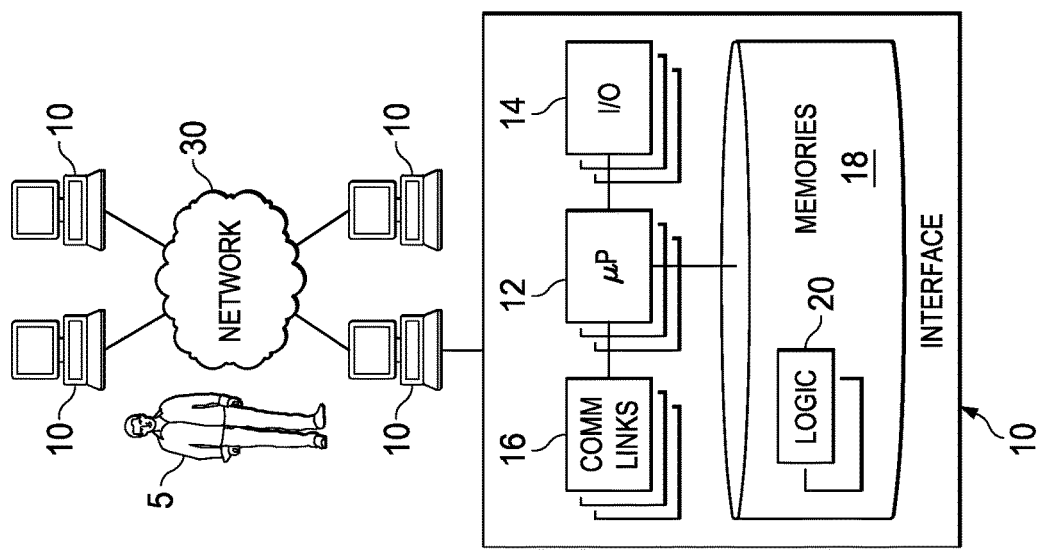

DISCONNECTING A ROTOR

TECHNICAL FIELD

This invention relates generally to rotorcraft rotors, and more particularly, to disconnecting a rotor.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may also include the capability to improve safety for ground personnel situated near a rotorcraft tail rotor. A technical advantage of one embodiment may also include the capability to disengage the tail rotor system portion of a rotorcraft such that the tail rotor blades are no longer powered. A technical advantage of one embodiment may also include the capability to prevent disengagement of the tail rotor system as well as provide for reengagement of the tail rotor system based on operating conditions of the rotorcraft, such as operating conditions indicative of when the rotorcraft is on the ground.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 2 shows one example of the clutch control system of FIG. 1B;

DETAILED DESCRIPTION OF THE DRAWINGS

Figure 1A:
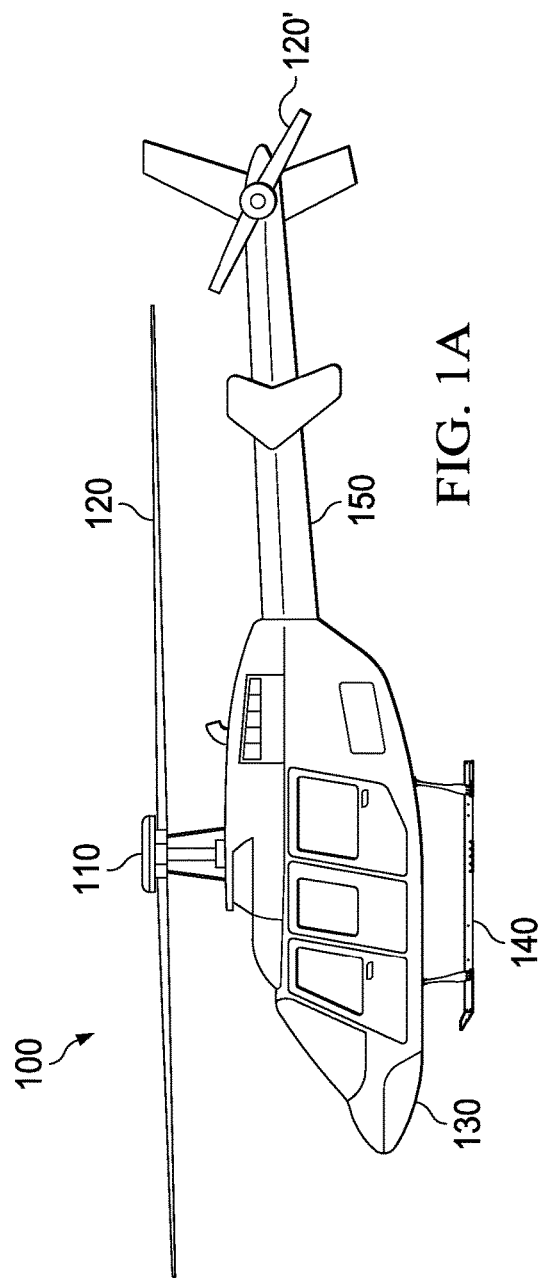
FIG. 1A shows a rotorcraft according to one example embodiment.

FIG. 1A shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

In the example of FIG. 1A, tail rotor blades 120' may pose certain safety issues. For example, when rotorcraft 100 is operating but still on the ground, tail rotor blades 120' may spin within feet of the ground. In this example, tail rotor blades 120' may pose a safety risk to ground personnel walking near rotorcraft 100. Although ideally, ground personnel should not walk near rotorcraft 100 while rotorcraft 100 is operating on the ground, sometimes such circumstances are practically unavoidable. For example, it may be necessary for medical personnel to approach rotorcraft 100 while rotorcraft 100 is still operating in order to unload an injured person from rotorcraft 100. Accordingly, teachings of certain embodiments recognize the capability to disengage the tail rotor system portion of rotorcraft 100 such that rotor system 110 no longer spins tail rotor blades 120'.

Although disengaging tail rotor blades 120' may resolve some safety issues, however, additional issues may arise if tail rotor blades 120' are disengaged at the wrong time. In particular, rotorcraft 100 may not fly properly if tail rotor blades 120' are disengaged when rotorcraft 100 is off the ground. Such may be the case, for example, if a pilot attempts to takeoff from the ground while tail rotor blades 120' are still disengaged.

Accordingly, teachings of certain embodiments recognize the capability to prevent disengagement of the tail rotor system as well as provide for reengagement of the tail rotor system based on operating conditions of the aircraft. In some embodiments, these operating conditions may be indicative of whether the aircraft is on the ground or in the air. Teachings of certain embodiments recognize the capability to prevent disengagement of the tail rotor system if the operating conditions do not satisfy predetermined criteria that indicate that the aircraft is on the ground at the time of disengagement.

Figure 1B:
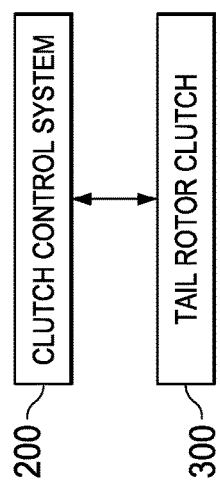
FIG. 1B shows a clutch control system and a clutch according to one example embodiment.

FIG. 1B shows a clutch control system 200 and a clutch 300 according to one example embodiment. In operation, according to some embodiments, clutch control system 200 may instruct clutch 300 as whether to engage or disengage tail rotor blades 120'. Clutch control system 200 and clutch 300 are described in greater detail with regard to FIGS. 2 and 3.

Although some of the examples described herein refer to engagement and disengagement of a tail rotor system such the anti-torque tail rotor system of FIG. 1, teachings of certain embodiments recognize the ability to disengage any suitable rotor system. For example, teachings of certain embodiments recognize the ability to disengage rotor systems that are not used for anti-torque. One example of a rotor system that is not used for anti-torque may include a propeller system that provides forward thrust to an aircraft. In addition, teachings of certain embodiments recognize the ability to disengage rotor systems that are not located near the tail of an aircraft. For example, teachings of certain embodiments recognize the capability to disengage rotor systems located near the wings of an aircraft.

FIG. 2 shows clutch control system 200 according to one example embodiment. In the example of FIG. 2, system 200 features a control unit 210, a clutch control switch 220, a clutch status indicator 230, a collective position sensor 240, a throttle position sensor 250, a weight-on-gear sensor 260, and an object proximity sensor 270, that may be implemented at least partially by one or more computer systems 10. All, some, or none of the components of system 200 may be located on or near rotorcraft 100 (or another aircraft).

Users 5 may access system 200 through computer systems 10. For example, in some embodiments, users 5 may access clutch control switch 220, which may be at least partially associated with a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Control unit 210 may provide control signals to clutch 300. For example, control unit 210 may transmit signals instructing clutch 300 to engage or disengage tail rotor blades 120'. In this example, control unit 210 may prevent disengagement of tail rotor blades 120' by providing signals instructing clutch 300 to remain engaged and/or by preventing transmission of disengagement signals to clutch 300.

Clutch control switch 220 provides a mechanism for receiving instructions from a pilot as to whether clutch 300 should be engaged or disengaged. Clutch status indicator 230 presents information indicating whether clutch 300 is engaged or disengaged. Clutch status indicator 230 may present information in any suitable manner, including providing visual, audible and/or tactile alerts. In one example embodiment, clutch status indicator 230 is a cockpit indicator. In some embodiments, clutch status indicator 230 may provide a warning that clutch 300 is disengaged. In some embodiments, clutch status indicator 230 may also provide a warning if clutch 300 is disengaged and an operating condition fails to satisfy a predetermined criteria. For example, clutch status indicator 230 may provide a warning if clutch 300 is disengaged and the collective position of blades 120 exceeds a predetermined threshold. Such warnings may be helpful, for example, to help prevent the pilot from taking off while clutch 300 is disengaged.

Teachings of certain embodiments recognize that control unit 210 may override instructions received from the pilot in some circumstances. For example, control unit 210 may prevent clutch 300 from disengaging tail rotor blades 120' if an operating condition of rotorcraft 100 fails to satisfy a predetermined criterion. In this example, system 200 may include one or more rotorcraft condition sensors operable to sense an operating condition of rotorcraft 100.

The example of FIG. 2 features four rotorcraft condition sensors: collective position sensor 240, throttle position sensor 250, weight-on-gear sensor 260, and object proximity sensor 270. Teachings of certain embodiments recognize that variations of system 200 may include more, fewer, or different rotorcraft condition sensors.

Collective position sensor 240 may sense a collective position of blades 120. The collective position of blades 120 may indicate whether blades 120 are generating lift. In one example embodiment, the collective position of blades 120 may represent an operating condition of rotorcraft 100, and the predetermined criterion may be defined as a predetermined collective position threshold. This predetermined collective position threshold may be set, for example, as the collective position value above which blades 120 generate lift and below which blades 120 do not generate lift. In this example, the operating condition may fail to satisfy the predetermined criterion if the sensed collective position associated with blades 120 exceeds this predetermined collective position threshold. Control unit 210 may compare the sensed collective position of blades 120 with the predetermined collective position threshold and prevent clutch 300 from disengaging tail rotor blades 120' if the sensed collective position of blades 120 exceeds the predetermined threshold.

Throttle position sensor 250 may sense a throttle position of rotorcraft 100. The throttle position of may indicate whether the engine of rotorcraft 100 is idling, in flight, or preparing to take off in flight. In one example embodiment, the throttle position may represent an operating condition of rotorcraft 100, and the predetermined criterion may be defined as a predetermined throttle position threshold. This predetermined throttle position threshold may be set, for example, as the throttle position value separating an engine idle mode from an engine flight mode. In this example, the operating condition may fail to satisfy the predetermined criterion if the sensed throttle position exceeds this predetermined throttle position threshold. Control unit 210 may compare the sensed throttle position with the predetermined throttle position threshold and prevent clutch 300 from disengaging tail rotor blades 120' if the sensed throttle position exceeds the predetermined threshold.

Weight-on-gear sensor 260 may sense the weight being supported by landing gear 140. The force applied down on landing gear 140 by rotorcraft 100 may indicate whether rotorcraft 100 is on the ground or is in the air. In one example embodiment, the weight-on-gear may represent an operating condition of rotorcraft 100, and the predetermined criterion may be defined as a predetermined weight. This predetermined weight may be set, for example, as a boundary between the weight-on-gear when rotorcraft 100 is on the ground and the weight-on-gear when rotorcraft 100 is in the air. In this example, the operating condition may fail to satisfy the predetermined criterion if landing gear 140 is supporting less than the predetermined weight. Control unit 210 may compare the sensed weight-on-gear with the predetermined weight and prevent clutch 300 from disengaging tail rotor blades 120' if the sensed weight-on-gear is less than the predetermined weight.

Object proximity sensor 270 may sense whether objects are near blades 120'. For example, object proximity sensor 270 may sense whether people are walking near blades 120'. In this example, control unit 210 may instruct clutch 300 to disengage tail rotor blades 120' if an object is detected. In some embodiments, object proximity sensor 270 may allow system 200 to provide a pilot warning indicating that objects have been sensed near blades 120'.

Teachings of certain embodiments recognize that variations of system 200 may receive inputs from other rotorcraft condition sensors in addition to and/or in place of those shown in FIG. 2. For example, a clutch input speed sensor (such as clutch input speed sensor 315 shown in FIG. 3) may sense a rotation speed of a component (such as drive shaft) between the power train of rotorcraft 100 and clutch 300. Similar to the throttle position, the component rotation speed may indicate whether the engine of rotorcraft 100 is idling, in flight, or preparing to take off in flight. In addition, the component rotation speed may indicate whether clutch 300 may be safely disengaged.

In this example, the operating condition may fail to satisfy the predetermined criterion if the sensed component rotation speed exceeds a predetermined rotation speed threshold. Control unit 210 may compare the sensed component rotation speed with the predetermined rotation speed threshold and prevent clutch 300 from disengaging tail rotor blades 120' if the sensed component rotation speed exceeds the predetermined threshold.

As another example, one or more devices may determine whether rotorcraft 100 is operating in autorotation flight. Autorotation may refer to the state of flight where the main rotor system of a helicopter is being turned by the action of air moving up through the rotor as with an autogyro, rather than engine power driving the rotor. In this example, the operating condition may fail to satisfy the predetermined criterion if rotorcraft 100 is operating in autorotation flight. Control unit 210 may prevent clutch 300 from disengaging tail rotor blades 120' if rotorcraft 100 is operating in autorotation flight.

In each of these examples, control unit 210 may prevent clutch 300 from disengaging tail rotor blades 120' if the sensed operating condition fails to satisfy the predetermined criterion. If the predetermined criterion is satisfied, however, control unit 210 may allow clutch 300 to disengaged tail rotor blades 120'.

If the operating condition changes and the predetermined criterion is no longer satisfied, control unit 210 may instruct clutch 300 to reengage blades 120'. For example, a scenario may exist in which a pilot must take off quickly and does not reengage the tail rotor (either by mistake or otherwise). In this example, taking off without engaging the tail rotor may negatively affect operation of rotorcraft 100. Accordingly, teachings of certain embodiments recognize the capability to reengage the tail rotor upon takeoff. In this example, reengagement may be triggered when one or more predetermined criteria is no longer satisfied. For example, control unit 210 may reengage the tail rotor if the throttle position exceeds a predetermined throttle threshold or the collective position exceeds a predetermined collective threshold.

In some embodiments, control unit 210 may prevent the pilot from taking off if the tail rotor system is not reengaged. For example, control unit 210 may prevent the pilot from increasing the throttle position past the predetermined throttle threshold or increasing the collective position past the collective position threshold if the tail rotor system is not reengaged.

In some embodiments, clutch 300 may be disengaged manually using clutch control switch 220. In addition, teachings of certain embodiments recognize the capability for control unit 210 automatically to disengage clutch 300 if the predetermined criterion is satisfied. In some embodiments, more than one predetermined criteria may need to be satisfied before control unit 210 automatically disengages clutch 300.

Figure 3:
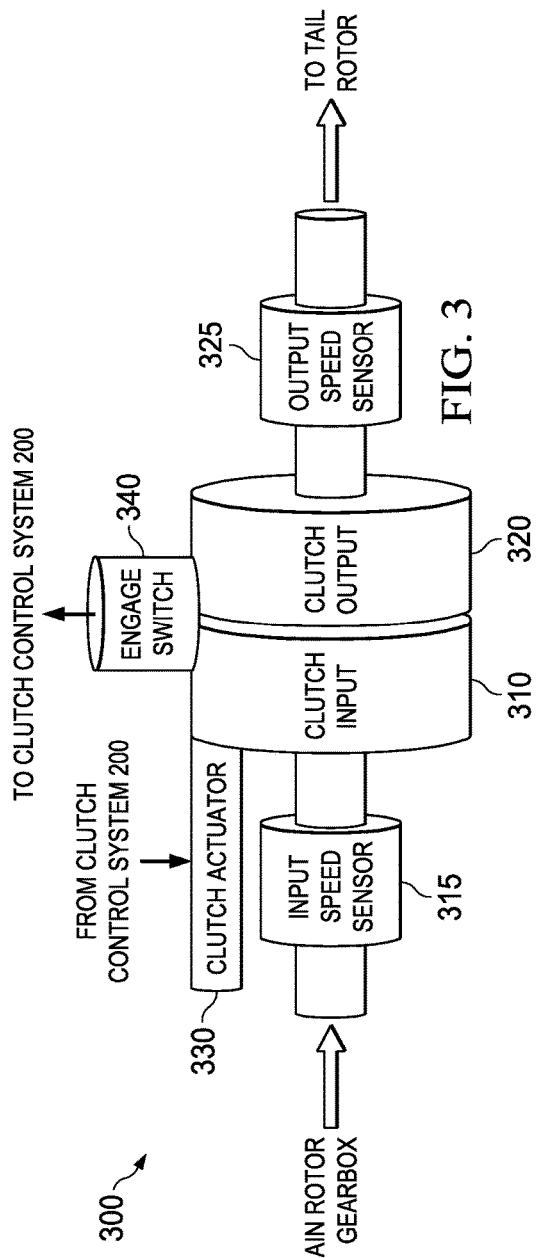
FIG. 3 shows one example of the clutch of FIG. 1B.

FIG. 3 shows clutch 300 according to one example embodiment. Clutch 300 features a clutch input 310, a clutch output 320, input speed sensor 315, an output speed sensor 325, a clutch actuator 330, and an engage switch 340.

In operation, clutch input 310 and clutch output 320 may be engaged and disengaged from each other. In the example of FIG. 3, clutch actuator 330 engages and disengages clutch input 310 and clutch output 320. Disengaging clutch output 320 from clutch input 310 may prevent clutch input 310 from transferring rotational energy to clutch output 320. In some embodiments, clutch input 310 and clutch output 320 may include mechanisms for preventing slam-engagement of the tail rotor system. Example mechanisms may include a slip clutch or a fluid-based system for reducing friction (e.g., viscous-fluid system that increases initial inertia during clutch reengagement). In some embodiments, clutch output 320 may be associated with a brake or other device for quickly stopping blades 120' after disengagement.

Engage switch 340 may inform clutch control system 200 as to the engagement status of clutch 300 (e.g., whether clutch output 320 is engaged or disengaged from clutch input 310). In some embodiments, this information may be presented to the pilot using the clutch status indicator 230 of FIG. 2.

Input speed sensor 315 and output speed sensor 325 measure the rotational input speed of clutch input 310 and the rotational output speed of clutch output 320. In the example of FIG. 3, input speed sensor 315 is located proximate to clutch input 310, and output speed sensor 325 is located proximate to clutch output 320. In some embodiments, however, sensors 315 and/or 315 may be located further from clutch input 310 and clutch output 320, such as closer to the main rotor gearbox or to the tail rotor system.

Figure 4:
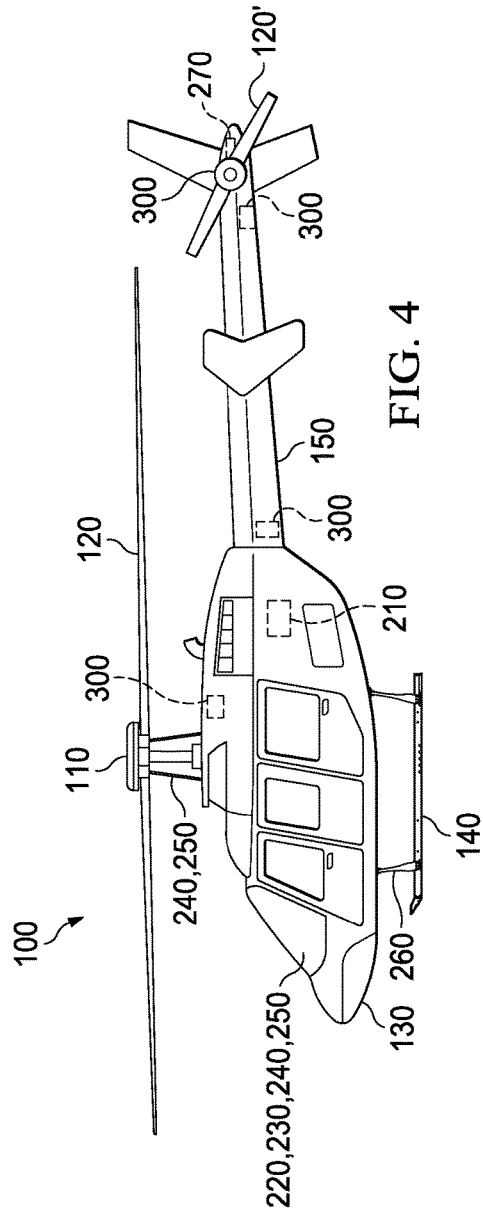
FIG. 4 shows example installations of the clutch control system and clutch of FIG. 1B in the rotorcraft of FIG. 1A.

FIG. 4 shows example installations of clutch control system 200 and clutch 300 on rotorcraft 100. In the example of FIG. 4, components of clutch control system 200 are installed in various locations in fuselage 130 and empennage 150. For example, control unit 210 is located between the mail rotor system and the tail rotor system, clutch control switch 220 and clutch status indicator 230 are installed in the cockpit, and sensors 230-270 are located about the aircraft. Teachings of certain embodiments recognize, however, that components of clutch control system 200 may be installed in any suitable location on or off the aircraft.

In the example of FIG. 4, clutch 300 is shown in several example locations, including near the main rotor system, in empennage 150 near fuselage 130, and in empennage 150 near tail rotor blades 120'. Teachings of certain embodiments recognize that clutch 300 may be installed in any suitable location.

Figure 5A:
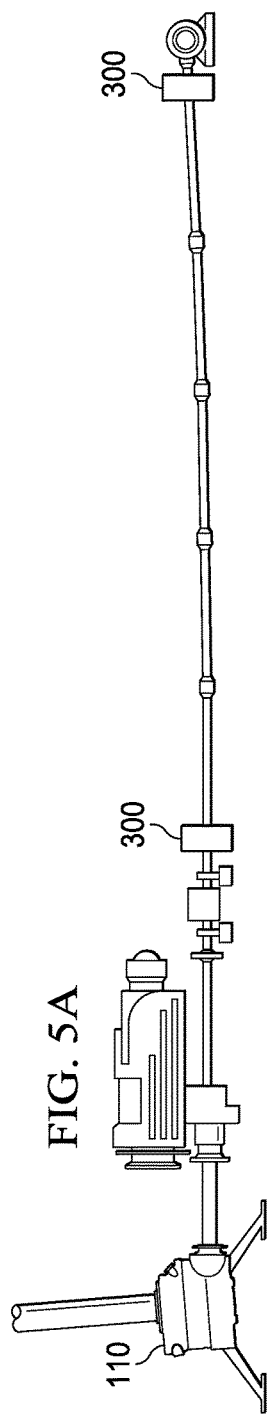
FIGS. 5A-5C show example installation positions of the clutch of FIG. 1B on three different drive systems.
Figure 5B:
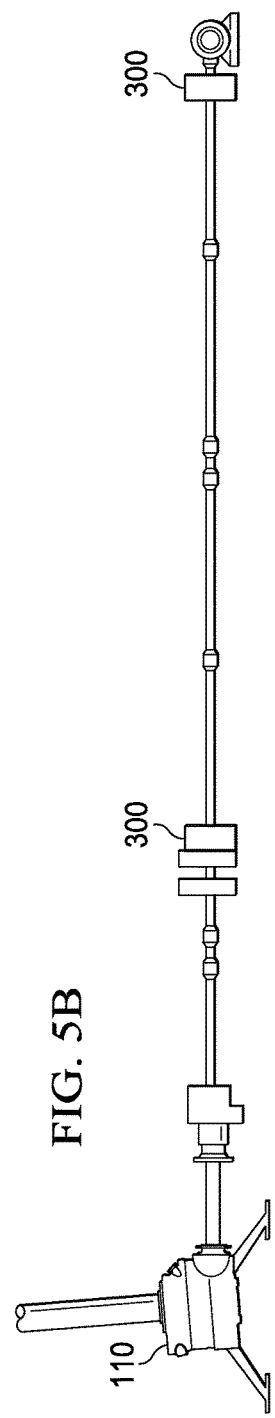
Figure 5C:
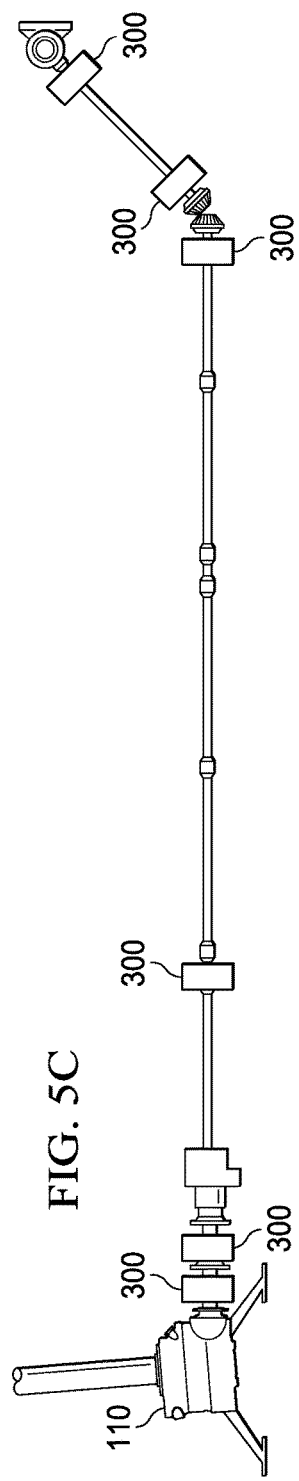

FIGS. 5A-5C show example installation positions of clutch 300 on three different drive systems. In each example, clutch 300 is installed between the main rotor gearbox and the tail rotor system. As seen in FIGS. 5A-5C, clutch 300 may be installed in any suitable location between the main rotor gearbox and the tail rotor system.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a main rotor system coupled to the power train, the main rotor system comprising at least one main rotor blade;
   a secondary rotor system coupled to the power train, the secondary rotor system comprising at least one secondary rotor blade;
   a clutch coupled between the secondary rotor system and the power train, the clutch operable to disengage the secondary rotor system from the power train during operation of the power train; and
   a clutch control system in communication with the clutch and comprising:
      a rotorcraft condition sensor operable to sense an operating condition of the rotorcraft indicative of whether the rotorcraft is on the ground; and
      a control unit operable to prevent the clutch from disengaging the secondary rotor system from the power train in response to the operating condition of the rotorcraft failing to satisfy a predetermined criterion whenever the rotorcraft condition sensor indicates that the rotorcraft is not on the ground.

2. The rotorcraft of claim 1, wherein the secondary rotor system is an anti-torque rotor system.

3. The rotorcraft of claim 1, wherein the secondary rotor system is a tail rotor system.

4. The rotorcraft of claim 1, wherein the rotorcraft condition sensor comprises a weight-on-gear sensor and the operating condition fails to satisfy the predetermined criterion whenever a landing gear coupled to the body is supporting less than a predetermined weight.

5. The rotorcraft of claim 1, wherein the rotorcraft condition sensor comprises a throttle position sensor and the operating condition fails to satisfy the predetermined criterion whenever a throttle position associated with the power train exceeds a predetermined threshold.

6. The rotorcraft of claim 1, wherein the rotorcraft condition sensor comprises a collective position sensor and the operating condition fails to satisfy the predetermined criterion whenever a collective position associated with the at least one main rotor blade exceeds a predetermined threshold.

7. The rotorcraft of claim 1, wherein the rotorcraft condition sensor comprises a clutch input speed sensor and the operating condition fails to satisfy the predetermined criterion whenever a rotating component coupled between the power train and the clutch rotates faster than a predetermined threshold.

8. The rotorcraft of claim 1, wherein the rotorcraft condition sensor is operable to sense whether the rotorcraft is operating in autorotation flight and the operating condition fails to satisfy the predetermined criterion whenever the rotorcraft is operating in autorotation flight.

9. The rotorcraft of claim 1, further comprising a pilot warning system operable to provide a pilot warning indicating that the secondary rotor system is disengaged.

10. The rotorcraft of claim 9, wherein the pilot warning system provides the pilot warning whenever the secondary rotor system is disengaged and the operating condition of the rotorcraft fails to satisfy the predetermined criterion.

11. The rotorcraft of claim 1, further comprising a pilot warning system operable to provide a pilot warning indicating that a proximity sensor has sensed an object near the secondary rotor system.

12. The rotorcraft of claim 1, the control unit further operable to reengage the secondary rotor system whenever the operating condition of the rotorcraft no longer satisfies the predetermined criterion.

* * * * *